(12) United States Patent
Al-Dhafiri

(10) Patent No.: US 8,875,411 B2
(45) Date of Patent: Nov. 4, 2014

(54) CYLINDRICAL RULER

(76) Inventor: Turki Awwad Al-Dhafiri, Sulaibkat (KW)

( * ) Notice: Subject to any disclaimer, the term of this patent is extended or adjusted under 35 U.S.C. 154(b) by 226 days.

(21) Appl. No.: 13/610,239

(22) Filed: Sep. 11, 2012

(65) Prior Publication Data

US 2014/0068954 A1 Mar. 13, 2014

(51) Int. Cl.
| | |
|---|---|
| *G01B 3/08* | (2006.01) |
| *B43L 7/10* | (2006.01) |
| *B43L 13/00* | (2006.01) |
| *G01B 1/00* | (2006.01) |
| *E01B 3/00* | (2006.01) |
| *E01B 3/34* | (2006.01) |
| *B43L 9/00* | (2006.01) |

(52) U.S. Cl.
USPC ............ 33/809; 33/464; 33/507; 33/529; 33/679.1; 33/21.1

(58) Field of Classification Search
USPC ........... 33/809, 178, 21.1, 464, 531, 544.4, 33/544.2, 542, 514.1, 507, 529, 810, 811, 33/679.1, 555.1, 555.4, 501.45, 296
See application file for complete search history.

(56) References Cited

U.S. PATENT DOCUMENTS

| | | | | |
|---|---|---|---|---|
| 69,954 | A | * | 10/1867 | Richards ............. 33/544.4 |
| 343,582 | A | | 6/1886 | Harwood |
| 1,264,519 | A | | 4/1918 | Hinson |
| 2,734,790 | A | * | 2/1956 | Pospie ................ 312/352 |
| 3,828,441 | A | | 8/1974 | Williams |
| 4,888,876 | A | | 12/1989 | Meredith et al. |
| 4,922,622 | A | * | 5/1990 | Galloway ............. 33/542 |
| 5,042,161 | A | | 8/1991 | Hodge |
| 5,199,180 | A | | 4/1993 | Yablonsky |
| 5,604,989 | A | | 2/1997 | Stevenson |
| 5,735,058 | A | * | 4/1998 | Jimenez ............. 33/809 |
| 5,873,175 | A | * | 2/1999 | Johnston ............. 33/809 |
| 2007/0107245 | A1 | | 5/2007 | Haug |

FOREIGN PATENT DOCUMENTS

| | | | |
|---|---|---|---|
| EP | 2084983 A2 | | 8/2009 |
| GB | 739845 | * | 11/1955 |

* cited by examiner

*Primary Examiner* — Peter Macchiarolo
*Assistant Examiner* — Rhyan C Lange
(74) *Attorney, Agent, or Firm* — Richard C Litman

(57) ABSTRACT

The cylindrical ruler is an elongated, hollow, cylindrical tube of known diameter having an axial slit extending the length of the tube. Indicia defining a circumferential scale are disposed around one end of the tube for measuring the length of an arc. Indicia defining a ruled scale extend lengthwise down the tube adjacent the slit for measuring length and width. Since the tube has a known diameter, it may be used to measure the inner or outer diameter of a pipe, the outer diameter or radius of curvature of a cylindrical lens, etc. The tube may also be used as a drawing tool to draw arcs, circles, or rectilinear lines on a cylindrical object. Preferably, the cylindrical ruler is furnished as a plurality of cylindrical tubes of progressively increasing diameter that can telescope within each other for storage and transport in a protective case.

20 Claims, 5 Drawing Sheets

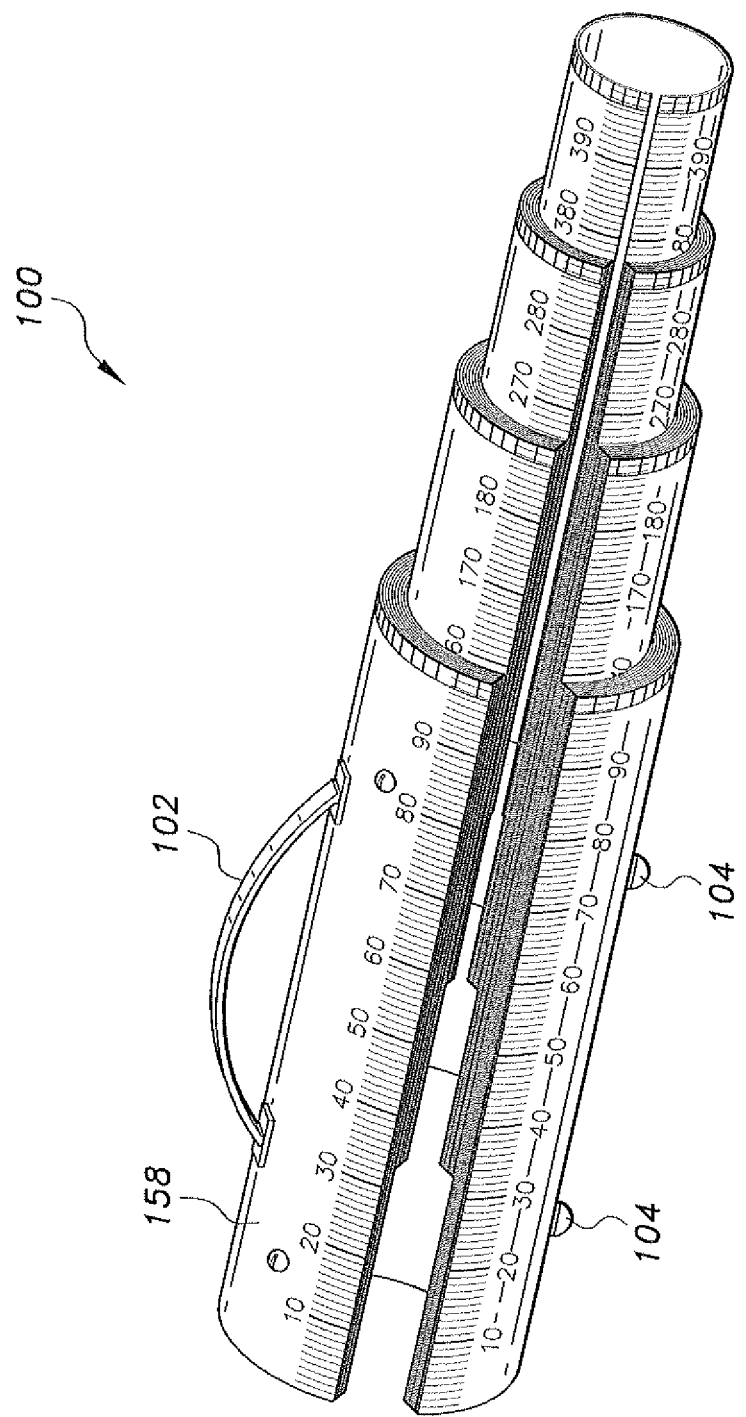

CYLINDRICAL RULER

BACKGROUND OF THE INVENTION

1. Field of the Invention

The present invention relates to measuring instruments, and particularly to a cylindrical ruler for easily and accurately measuring curved objects (such as cylindrical lenses, pipes and hoses) and drawing and/or etching thereon.

2. Description of the Related Art

Cylindrical objects, such as cylindrical lenses, are difficult to measure accurately with normal measuring instruments. Typically, a tape ruler would be used, but this practice can be subject to wide variances and inaccuracies due to the inherent flexibility and/elasticity of tape rulers, as well as potential human error.

Many measuring devices have been proposed that may facilitate measuring of circular objects. A common measuring instrument is a bow compass. Some accurate measurements can be obtained, but a bow compass must be matched against a separate ruler, often repeatedly, in order to obtain such results.

Another instrument that is commonly used is a protractor. Depending on the gradients used, these can provide very accurate measurements in degrees, radians, and in some designs, the actual arc length or diameter. However, common protractors tend to be very limited in measuring arcs or diameters, since the diameter of the object and the diameter of the protractor must be the same for accurate results. Otherwise, additional conversions and calculations must be made to obtain the desired results.

Still another conventional instrument includes a mandrel, such as a jeweler's mandrel. These instruments are usually constructed as an elongate, frustoconical bar having a handle at one end. The elongate bar is usually marked along the length thereof with standard ring sizes, so that the size or inner diameter of a ring can be easily determined by sliding the ring on the bar. Wherever the ring stops, the corresponding size is indicated by a mark next to the ring. This type of instrument is accurate to a degree, but limited to the size of the mandrel and the structure thereof, which usually renders the mandrel applicable to relatively small diameter structures. Moreover, if the user desires to draw with a mandrel-type instrument, the drawing would be limited to the circle at the end of the mandrel. The mandrel also lacks a straight edge for a user to use in order to generate a straight line.

In light of the above, it would be a benefit in the art of measuring instruments to provide a device that can accurately measure a variety of circular objects in a relatively fast manner and facilitate drawing thereof. Thus, a cylindrical ruler solving the aforementioned problems is desired.

SUMMARY OF THE INVENTION

The cylindrical ruler is an elongated, hollow, cylindrical tube of known diameter having an axial slit extending the length of the tube. Indicia defining a circumferential scale are disposed around one end of the tube for measuring the length of an arc. Indicia defining a ruled scale extend lengthwise down the tube adjacent the slit for measuring length and width. Since the tube has a known diameter, it may be used to measure the inner or outer diameter of a pipe, the outer diameter or radius of curvature of a cylindrical lens, etc. The tube may also be used as a drawing tool to draw arcs, circles, or rectilinear lines on a cylindrical object. Preferably, the cylindrical ruler is furnished as a plurality of cylindrical tubes of progressively increasing diameter that can telescope within each other for storage and transport in a protective case.

These and other features of the present invention will become readily apparent upon further review of the following specification and drawings.

BRIEF DESCRIPTION OF THE DRAWINGS

FIG. 4A is a perspective view of an alternative embodiment of a cylindrical ruler according to the present invention.

Similar reference characters denote corresponding features consistently throughout the attached drawings.

DETAILED DESCRIPTION OF THE PREFERRED EMBODIMENTS

The cylindrical ruler is an elongated, hollow, cylindrical tube of known diameter having an axial slit extending the length of the tube. Indicia defining a circumferential scale are disposed around one end of the tube for measuring the length of an arc. Indicia defining a ruled scale extend lengthwise down the tube adjacent the slit for measuring length and width. Since the tube has a known diameter, it may be used to measure the inner or outer diameter of a pipe, the outer diameter or radius of curvature of a cylindrical lens, etc. The tube may also be used as a drawing tool to draw arcs, circles, or rectilinear lines on a cylindrical object. Preferably, the cylindrical ruler is furnished as a plurality of cylindrical tubes of progressively increasing diameter that can telescope within each other for storage and transport in a protective case.

Figure 1:
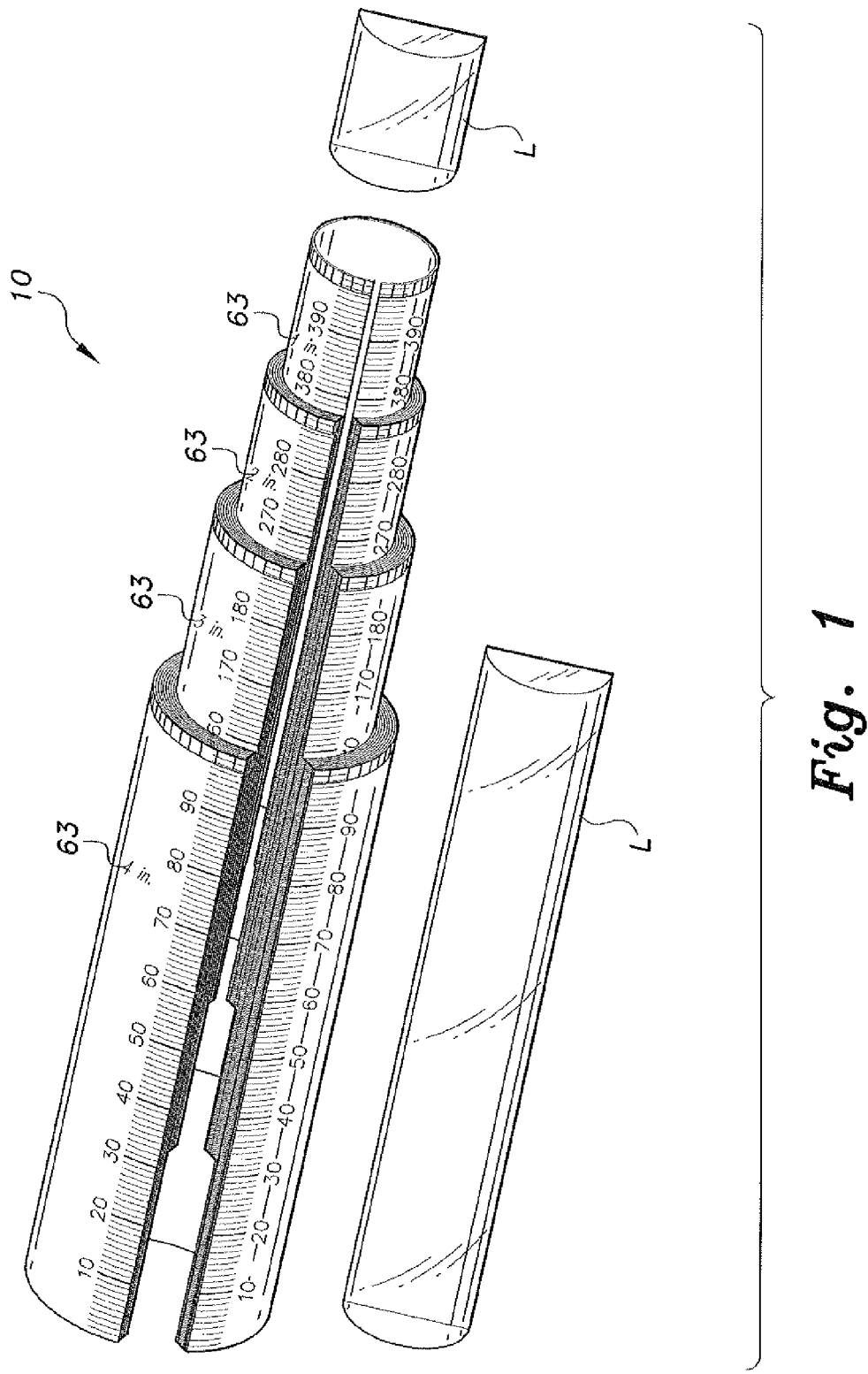
FIG. 1 is an environmental, perspective view of a cylindrical ruler according to the present invention.
Figure 2:
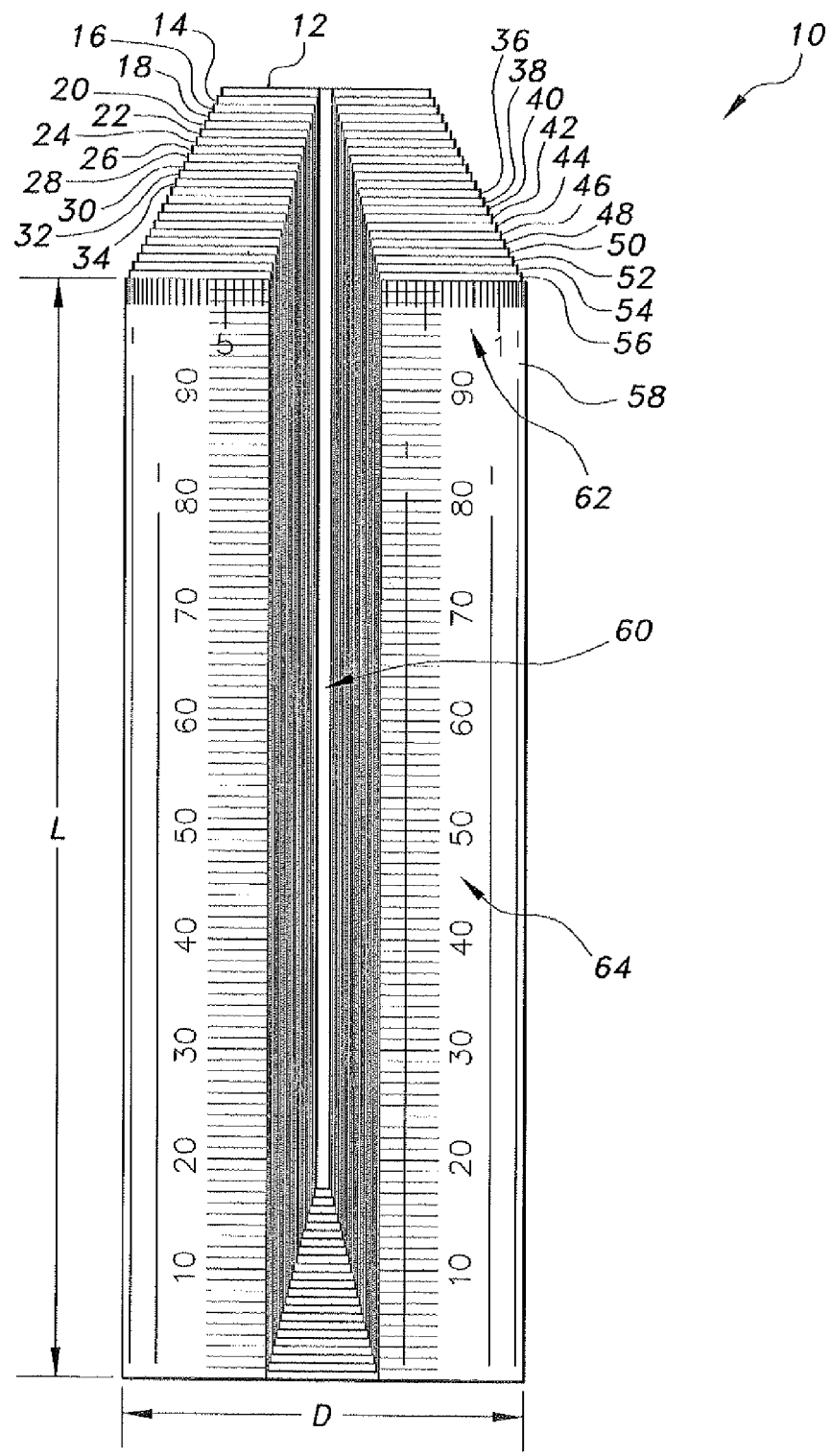
FIG. 2 is a front view of the cylindrical ruler of FIG. 1.
Figure 3:
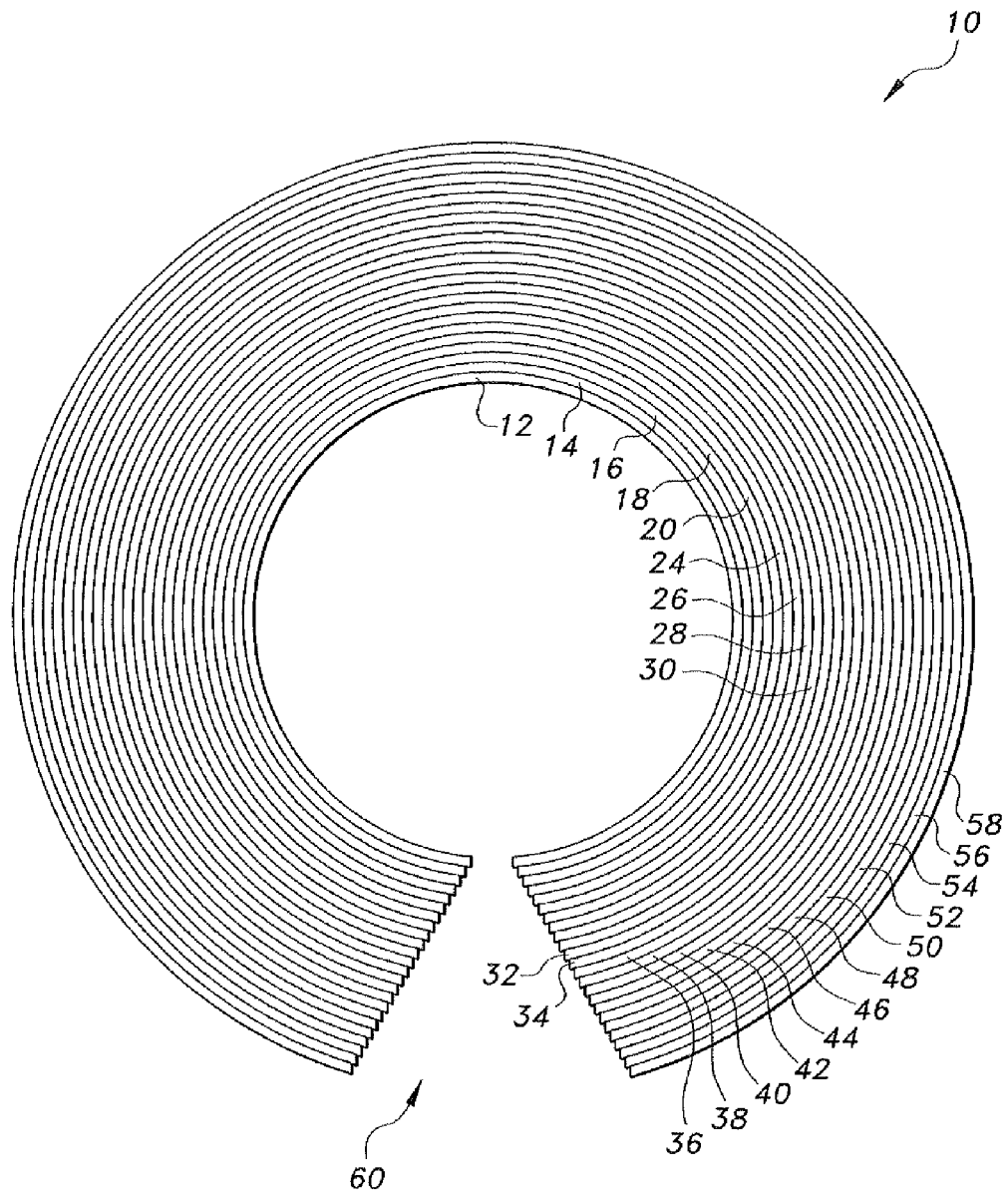
FIG. 3 is a top view of the cylindrical ruler of FIG. 1.

The cylindrical ruler may be furnished as a kit, generally referred to by the reference number 10 in the drawings, to provide swift and accurate measurements of cylindrical objects and a means for drawing. As shown in FIGS. 1-3, the cylindrical ruler kit 10 includes a plurality of tubular members 12, 14, 16, . . . , 58 engaged with each other in a telescoping manner. In this example, the cylindrical ruler kit 10 is provided with twenty-four concentrically smaller tubular members 12-58, each of them forming a cylindrical ruler. Each tubular member 12-58 may be made from aluminum, zinc, plastic, or other suitable rigid material. One end of each tubular member 12-58 includes a graduated circumferential scale 62 around the outer diameter thereof. The circumferential scale 62 can be composed of any standard unit of measurement. In this embodiment, the circumferential scale 62 is preferably calibrated in English or Imperial standard units of measure. The diameter of the tubular members 12-58 preferably range from 0.25 in.-6.00 in. in increments of 0.25 in. The tubular members 12-58 also have indicia 63 thereon identifying the diameter of the tubular member. Since each tubular member 12-58 has a fixed diameter, the user can quickly ascertain the diameter of a corresponding number of standard size objects, especially cylindrical lenses L. The arc length of the object can also be measured easily with the circumferential gradations 62.

In addition to the above, the tubular members 12-58 can be divided into sets, e.g., six sets of tubular members, each set having four tubular members to conveniently determine which set to utilize for a desired object. To further identify the best tubular member for measurements, each tubular member 12-58 can be constructed with different colors (color-coded) for easy identification.

In the embodiment shown in FIGS. 1-3, each tubular member 12-58 includes an axial slit 60 that extends the length of the tubular member. A graduated scale 64 is formed along at least one longitudinal edge of the axial slit 60, preferably calibrated in the metric scale (millimeters and centimeters), whereby lengths can be measured with ease. In addition, the straight edge and the circular edge can be used to draft, draw or mark on various surfaces. Each tubular member 12-58 is preferably about 10 cm long, which will satisfy most measuring applications.

In use, the user selects one of the desired tubular members 12-58 corresponding to an approximate size matching that of the object to be measured. If the object is solid, such as a cylindrical or semicylindrical lens L, the object may be inserted inside the tubular member 12-58 to find the closest fit, which gives the diameter or radius of curvature of the lens. The arc length of a semicylindrical lens may be read using the circumferential scale 62. If the object is hollow, the object may be inserted into the tubular member 12-58 to find the outer diameter of the pipe, or inside the pipe to find the inner diameter of the pipe. Each tubular member 12-58 may be used as a drawing tool to draw on a pipe by sliding one of the tubular members 12-58 over the pipe and inserting the nib of a pen, pencil, or other drawing tool through the axial slit 60 to draw a line axially, or using the longitudinal ends of the tubular member 12-58 as a guide for drawing an arc around the pipe.

Preferably, the desired tubular member 12-58 can be accessed from either of the longitudinal ends of the cylindrical ruler 10.

Figure 4B:
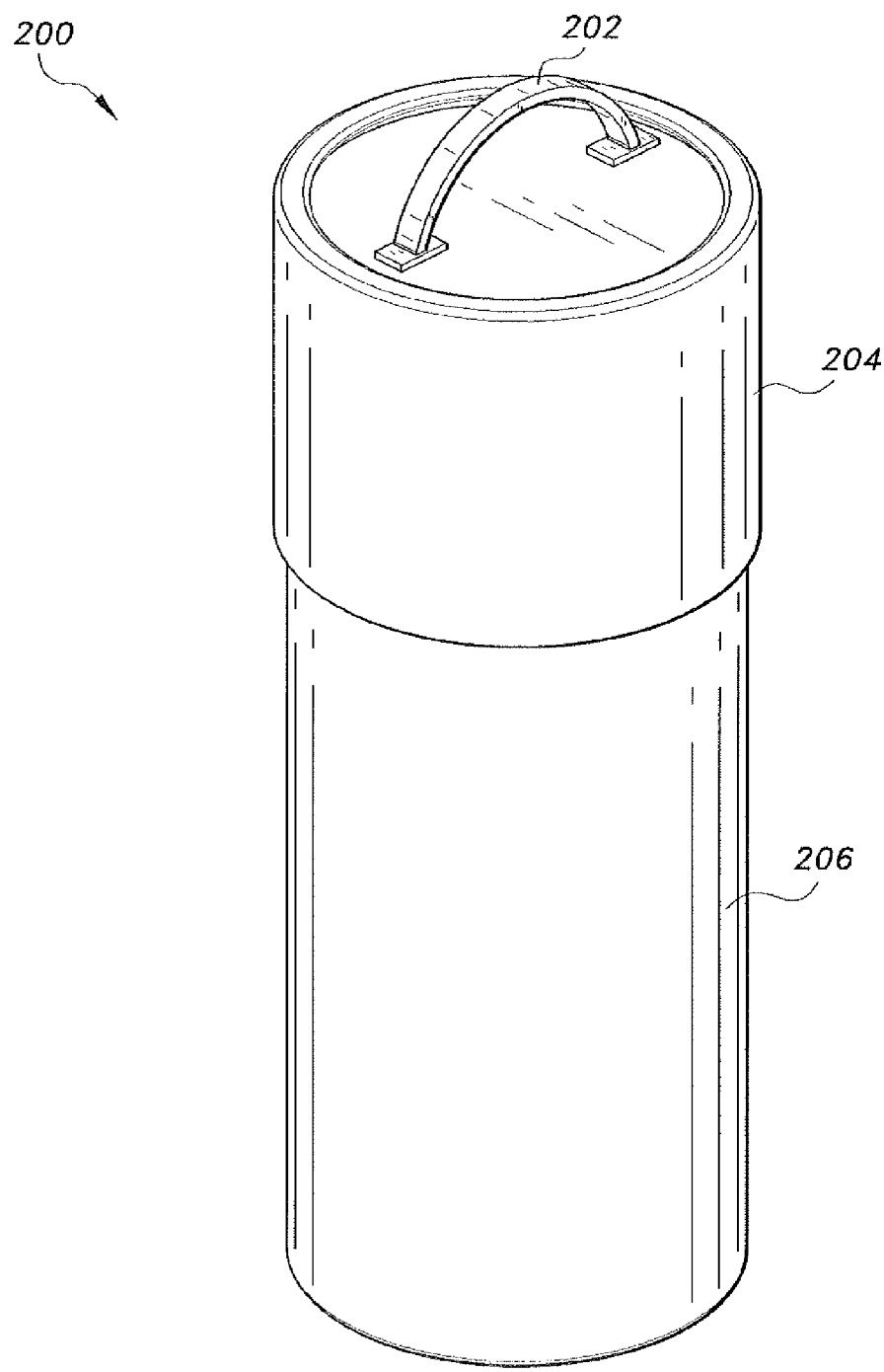
FIG. 4B is a perspective view of a case for a cylindrical ruler according to the present invention.

FIGS. 4A and 4B show alternative embodiments exemplary of features that facilitate convenient portability of the cylindrical ruler kit. In FIG. 4A, the cylindrical ruler kit 100 includes a handle 102 attached to the outer tubular member 158. A plurality of feet 104 can also be attached to the tubular member 158 to provide a stable base for placing the cylindrical ruler kit 100 onto a surface and help prevent potential and unintentional marring of the surface thereof.

In FIG. 4B, the cylindrical ruler kit 200 can be provided with a protective case 206 for holding the telescoped cylindrical rulers therein. A cap or cover 204 covers the open end of the case 206 and is secured thereon by any known means, such as a friction fit. The cap 204 can be provided with a handle 202 for ease of portability. Alternatively, the outer tubular member can be used as a case and covered by the cap 204.

It is to be understood that the present invention is not limited to the embodiments described above, but encompasses any and all embodiments within the scope of the following claims.

I claim:

1. A method of measuring parameters of a hollow pipe using a cylindrical ruler kit, the cylindrical ruler kit comprises a plurality of tubular members, each of the tubular members being an elongate, hollow, cylindrical tube open at both ends, the tube having an axial slit defined therein extending the length of the tube, the tube having a fixed, known diameter, each of the tubes having:
   a first indicia disposed on the tube marking the known diameter of the tube;
   a second indicia disposed circumferentially about at least one end of the tube, the second indicia marking the at least one end of the tube with a graduated circumferential scale indicating the circumferential distance around the at least one end of the tube; and
   a third indicia disposed lengthwise along the tube adjacent the axial slit, the third indicia marking the tube with a graduated ruled scale indicating the rectilinear distance along the tube, each of the tubular members having a different diameter, the tubular members telescoping within the largest diameter tubular member for compact storage and transport; the method comprising the steps of:
   inserting the pipe into the tubular members of progressively increasing diameter until a first matching tube having the closest fit of curvature to the pipe is found;
   reading the first indicia from the first matching tube to determine the outer diameter of the pipe;
   aligning the pipe with the ruled scale of the first matching tube and reading the axial length of the pipe;
   inserting tubular members of progressively increasing diameter into the pipe until a second matching tube having the closest fit of curvature to the pipe is found; and
   reading the first indicia from the second matching tube to determine the inner diameter of the pipe.

2. A method of drawing an arc on a hollow pipe according to claim 1, comprising the steps of:
   sliding the first matching tube over the pipe; and
   using a drawing instrument aligned with one of the ends of the tube as a guide for drawing the arc on the pipe; and
   using the circumferential scale to draw the arc to a measured length.

3. A method of drawing an axial straight line on a hollow pipe according to claim 2, comprising the steps of:
   after the sliding step, aligning the drawing instrument with the axial slit; and
   using the axial slit as a guide to draw the axial straight line on the pipe.

4. The method of measuring parameters of a hollow pipe according to claim 1, wherein each of the tubes of the cylindrical ruler kit is made of metal.

5. The method of measuring parameters of a hollow pipe according to claim 1, wherein each of the tubes of cylindrical ruler kit is made of plastic.

6. The method of measuring parameters of a hollow pipe according to claim 1, where the graduated circumferential scale of the cylindrical ruler kit is calibrated in English system units of measure.

7. The method of measuring parameters of a hollow pipe according to claim 1, wherein the ruled scale of the cylindrical ruler kit is calibrated in metric system units of measure.

8. The method of measuring parameters of a hollow pipe according to claim 1, wherein the cylindrical ruler kit further comprises a protective case having:
   a cylindrical case having an open end and a closed end; and
   a cap removably disposed over the open end of the case, the plurality of tubular members being removably disposed within the case when telescoped together for storage and transport.

9. The method of measuring parameters of a hollow pipe according to claim 8, wherein the cylindrical ruler kit further comprises a handle disposed on the protective case.

10. The method of measuring parameters of a hollow pipe according to claim 1, wherein the cylindrical ruler kit further comprises a handle disposed on the largest diameter tube for ease in transporting the kit.

11. The method of measuring parameters of a hollow pipe according to claim 10, wherein the cylindrical ruler kit further comprises a plurality of feet mounted on the largest tube opposite the handle.

12. A method of measuring parameters of a semicylindrical lens using a cylindrical ruler kit, wherein the cylindrical ruler kit comprises:
- a plurality of tubular members, each of the tubular members being an elongate, hollow, cylindrical tube open at both ends, the tube having an axial slit defined therein extending the length of the tube, the tube having a fixed, known diameter, each of the tubes having:
- a first indicia disposed on the tube marking the known diameter of the tube;
- a second indicia disposed circumferentially about at least one end of the tube, the second indicia marking the at least one end of the tube with a graduated circumferential scale indicating the circumferential distance around the at least one end of the tube; and
- a third indicia disposed lengthwise along the tube adjacent the axial slit, the third indicia marking the tube with a graduated ruled scale indicating the rectilinear distance along the tube, each of the tubular members having a different diameter, the tubular members telescoping within the largest diameter tubular member for compact storage and transport; wherein the method of measuring parameters of a semicylindrical lens comprising the steps of:
- inserting the semicylindrical lens into the tubular members of progressively increasing diameter until a matching tube having the closest fit of curvature to the semicylindrical lens is found;
- reading the first indicia from the matching tube to determine the diameter and dividing by two to obtain the radius of curvature of the lens;
- aligning opposing lateral edges of the semicylindrical lens with the circumferential scale and reading the length of the arc defined by the semicylindrical lens; and
- aligning the semicylindrical lens with the ruled scale and reading the axial length of the semicylindrical lens.

13. The method of measuring parameters of a semicylindrical lens according to claim 12, wherein each of the tubes of the cylindrical ruler kit is made of metal.

14. The method of measuring parameters of a semicylindrical lens according to claim 12, wherein each of the tubes of cylindrical ruler kit is made of plastic.

15. The method of measuring parameters of a semicylindrical lens according to claim 12, where the graduated circumferential scale of the cylindrical ruler kit is calibrated in English system units of measure.

16. The method of measuring parameters of a semicylindrical lens according to claim 12, wherein the ruled scale of the cylindrical ruler kit is calibrated in metric system units of measure.

17. The method of measuring parameters of a semicylindrical lens according to claim 12 wherein the cylindrical ruler kit further comprises a protective case having:
- a cylindrical case having an open end and a closed end; and
- a cap removably disposed over the open end of the case, the plurality of tubular members being removably disposed within the case when telescoped together for storage and transport.

18. The method of measuring parameters of a semicylindrical lens according to claim 17, wherein the cylindrical ruler kit further comprises a handle disposed on the largest diameter tube for ease in transporting the kit.

19. The method of measuring parameters of a semicylindrical lens according to claim 12, wherein the cylindrical ruler kit further comprises a handle disposed on the largest diameter tube for ease in transporting the kit.

20. The method of measuring parameters of a semicylindrical lens according to claim 19, wherein the cylindrical ruler kit further comprises a handle disposed on the largest diameter tube for ease in transporting the kit.

* * * * *